US010270500B2

(12) United States Patent
Chen et al.

(10) Patent No.: US 10,270,500 B2
(45) Date of Patent: Apr. 23, 2019

(54) CHANNEL INFORMATION FEEDBACK METHOD, BASE STATION AND TERMINAL

(71) Applicant: ZTE CORPORATION, Shenzhen, Guangdong Province (CN)

(72) Inventors: Yijian Chen, Shenzhen (CN); Zhaohua Lu, Shenzhen (CN); Jing Zhao, Shenzhen (CN); Huahua Xiao, Shenzhen (CN); Guanghui Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 238 days.

(21) Appl. No.: 15/107,934

(22) PCT Filed: Jun. 23, 2014

(86) PCT No.: PCT/CN2014/080496
§ 371 (c)(1),
(2) Date: Jun. 24, 2016

(87) PCT Pub. No.: WO2015/096423
PCT Pub. Date: Jul. 2, 2015

(65) Prior Publication Data
US 2016/0323021 A1 Nov. 3, 2016

(30) Foreign Application Priority Data

Dec. 26, 2013 (CN) .......................... 2013 1 0730930

(51) Int. Cl.
*H04B 7/04* (2017.01)
*H04L 5/00* (2006.01)
(Continued)

(52) U.S. Cl.
CPC ......... *H04B 7/0417* (2013.01); *H04B 7/0413* (2013.01); *H04B 7/0486* (2013.01);
(Continued)

(58) Field of Classification Search
CPC .. H04B 7/0658; H04B 7/0478; H04B 7/0634; H04B 7/00; H04B 7/10;
(Continued)

(56) References Cited

U.S. PATENT DOCUMENTS

2008/0159425 A1\* 7/2008 Khojastepour ...... H04B 7/0417
375/260
2008/0317145 A1 12/2008 Clerckx et al.
(Continued)

FOREIGN PATENT DOCUMENTS

CN 101667895 A 3/2010
CN 101771514 A 7/2010
(Continued)

OTHER PUBLICATIONS

International Search Report dated Sep. 30, 2014 in PCT Patent Application No. PCT/CN2014/080496.
(Continued)

*Primary Examiner* — Mark H Rinehart
*Assistant Examiner* — Kenneth P Hunt
(74) *Attorney, Agent, or Firm* — Plumsea Law Group, LLC

(57) ABSTRACT

A method for channel information feedback, a base station and a device, the method includes: a terminal performs a channel measurement, constructs an information matrix used for representing channel information according to a preset function, determines optimal channel parameters and feeds back the channel parameters to a base station; and the base station constructs quantization information of a characteristic vector of a channel matrix according to the received channel parameters and the channel matrix. In the technical solution provided by the embodiment of the present document, since the most essential characteristic of a dual-polarized channel, i.e., information u that represents a
(Continued)

multipath direction, is matched in the channel matrix, channel information feedback with the lowest cost is implemented, and compared with the existing codebook feedback solution, on the basis that feedback precision is satisfied, the feedback overhead is obviously reduced, terminal implementation complexity is reduced and feedback efficiency is improved.

16 Claims, 1 Drawing Sheet

(51) Int. Cl.
  *H04W 72/04* (2009.01)
  *H04W 72/08* (2009.01)
  *H04B 7/0417* (2017.01)
  *H04B 7/0413* (2017.01)
  *H04B 7/06* (2006.01)
  *H04B 7/0456* (2017.01)
  *H04L 25/02* (2006.01)

(52) U.S. Cl.
  CPC ......... *H04B 7/0619* (2013.01); *H04B 7/0658* (2013.01); *H04B 7/0663* (2013.01); *H04L 5/0051* (2013.01); *H04W 72/0413* (2013.01); *H04W 72/085* (2013.01); *H04L 25/0202* (2013.01)

(58) Field of Classification Search
  CPC .......... H04B 7/02–7/028; H04B 7/04–7/0486; H04B 7/06–7/0663; H04L 5/0051; H04L 25/0242–25/0248; H04L 25/03949; H04L 25/0202–25/03974; H04W 72/0413; H04W 72/085
  See application file for complete search history.

(56) References Cited

U.S. PATENT DOCUMENTS

| | | | |
|---|---|---|---|
| 2009/0016463 A1* | 1/2009 | Roh | H04B 7/0417 375/295 |
| 2011/0002371 A1* | 1/2011 | Forenza | H04B 7/0417 375/227 |
| 2011/0200081 A1* | 8/2011 | Guo | H04B 7/0417 375/224 |
| 2012/0307649 A1 | 12/2012 | Park et al. | |
| 2013/0279615 A1* | 10/2013 | Thomas | H04B 7/0617 375/260 |
| 2015/0049824 A1* | 2/2015 | Kim | H04B 7/0456 375/267 |

FOREIGN PATENT DOCUMENTS

| | | |
|---|---|---|
| CN | 101834706 A | 9/2010 |
| CN | 102833194 A | 12/2012 |

OTHER PUBLICATIONS

European Search Report dated Oct. 31, 2016 for EP Application No. 14875807.1 (9pp).

* cited by examiner

CHANNEL INFORMATION FEEDBACK METHOD, BASE STATION AND TERMINAL

CROSS-REFERENCE TO RELATED APPLICATION(S)

This application is the U.S. National Phase application of PCT application number PCT/CN2014/080496 having a PCT filing date of Jun. 23, 2014, which claims priority of Chinese patent application 201310730930.8 filed on Dec. 26, 2013, the disclosures of which are hereby incorporated by reference.

TECHNICAL FIELD

The present invention relates to a massive wireless communication technology, in particular to a method for channel information feedback, a base station and a device.

BACKGROUND OF RELATED ART

In a wireless communication system, usually a transmitting end and a receiving end obtain higher transmission rate by using a spatial multiplexing mode and using a plurality of antennas. Compared with a common spatial multiplexing mode, an enhanced technique is that the receiving end feeds back channel information to the transmitting end and the transmitting end uses some transmission precoding techniques according to the obtained channel information to greatly improve transmission performance. For single-user Multi-input Multi-output (MIMO), channel characteristic vector information is directly used for precoding; and for Multi-user MIMO (MU-MIMO), more accurate channel information is needed.

In some techniques such as in Long Term Evolution LTE (Long Term Evolution) of 4G, 802.16m standard specification, feedback of channel information mainly utilizes a simpler single-codebook feedback way, but the performance of the transmission precoding technique of MIMO is more dependent on the accuracy of codebook feedback. Here, the basic principle of the channel information quantization feedback based on a codebook is simply introduced below:

Supposing that limited feedback channel capacity is B bps/Hz, the number of available code words is $N=2^B$. Supposing that a characteristic vector space of a channel matrix H forms a codebook space $\Re = \{F_1, F_2 \text{ L } F_N\}$ after quantization, the transmitting end and the receiving end both save or generate the codebook (the codebook in the receiving end/transmitting end is the same) in real time. The receiving end selects a code word $\hat{F}$ which is the most matched with a channel from the codebook space $\Re$ in accordance with a certain criterion according to the received channel matrix H, and feeds back a code word sequence number i of the code word $\hat{F}$ to the transmitting end, herein the code word sequence number is also called as a Precoding Matrix Indicator (PMI); and the transmitting end finds the corresponding precoding code word $\hat{F}$ according to the fed-back code word sequence number i and thus obtains the channel information, herein $\hat{F}$ denotes characteristic vector information of the channel.

With the high-speed development of the wireless communication technology, the wireless application of users is increasingly rich, thereby the quick increase of the wireless data service is driven, a huge challenge is brought to wireless access networks, and a multi-antenna technique is a key technique for coping with explosive increase challenge of wireless data service. At present, the multi-antenna technique supported in 4G is a horizontal-dimension beam forming technology which only supports 8 ports at most, and there is a greater potential to further greatly improve system capacity.

Evolution of the multi-antenna technique is performed mainly around targets such as higher beam forming/precoding gains, more space multiplexing layers (MU/SU), smaller interlayer interference, more overall coverage and smaller interference between sites. Massive MIMO and 3D MIMO are two main techniques for MIMO evolution in the next generation wireless communication.

For a system based on a Massive MIMO technique, a base station side is configured with a massive antenna array, for example, 100 antennas or even more. In this way, during data transmission, multiple users are multiplexed simultaneously at a same frequency by using the MU-MIMO technique, and generally, a ration of the number of the antennas and the number of multiplexed users is maintained to be about 5-10 times. In one aspect, no matter whether it is a strongly-correlative channel in a line-of-sight environment or a non-correlative channel under a rich scattering environment, a correlation coefficient between channels of any two users is exponentially attenuated with the increase of the number of the antennas. For example, when the base station side is configured with 100 antennas, the correlation coefficient between the channels of any two users is approximately 0, i.e., corresponding channels of multiple users are approximately orthogonal. In another aspect, a massive array can bring very considerable array gains and diversity gains. For 3D MIMO, in a vertical dimension and a horizontal dimension, beam forming capabilities are very good. This requires antennas to be arranged in 2D form instead of in a single dimension only. Due to the limitation of antenna size, there is little possibility to place more than a hundred of antennas in one dimension. Therefore, in most application scenarios, when the Massive MIMO technology is applied, the 3D MIMO is generally used in a combined manner. In addition, in order to reduce the antenna size and provide better diversity performance or multiplexing performance, dual-polarized antennas are also widely applied to the Massive MIMO. By using the dual-polarized antennas, the antenna size can be reduced to half of the original size.

For Massive MIMO, due to the introduction of massive antennas, the existing channel information feedback way is that, i.e., each antenna transmits a CSI-RS (Channel State Information Reference Signal), and a terminal detects the CSI-RS, obtains a channel matrix corresponding to each transmission resource through channel estimation, obtains an optimal precoding vector of each frequency-domain sub-band on a base band and optimal transmission layer number information of a broadband according to the channel matrix, and then performs a channel information feedback based on the introduced codebook feedback technique above-mentioned. The way of channel information feedback has greater problems during application in Massive MIMO. In one aspect, pilot overhead can increase with the increase of base station antenna number Nt and is very huge when the number of antennas is great. In another aspect, since the codebook used during feedback needs to contain a great many code words, it is very difficult to select the code words, and very great complexity is caused to the implementation at the terminal and there is almost no possibility to implement, or a huge cost needs to be spent. In addition, the overhead for codebook feedback is so great that the uplink overhead is huge. In other words, it is very difficult to obtain better performance in the massive antenna system by adopting the existing codebook feedback technique and expected multi-antenna gains cannot be obtained.

Especially, for dual-polarized channels, due to non-correlation in polarization, ranks of channels are generally greater than 1 and this means that more information needs to be fed back. More serious feedback performance and overhead problems than single-polarized channels would be encountered.

SUMMARY OF THE INVENTION

In order to solve the technical problem, the embodiment of the present invention provide a method for channel information feedback, a base station and a terminal, which are applicable to a system based on a Massive MIMO technique.

In order to achieve the purpose of the present invention, the embodiment of the present invention provides a method for channel information feedback, including: a terminal performing channel measurement, constructing an information matrix according to a preset function, determining quantified channel parameters and feeding back the channel parameters to a base station, the information matrix used for representing channel information; and the base station constructing quantization information which indicates a quantitative model of a characteristic vector of a channel matrix according to the channel matrix.

The information for representing the channel includes first channel information and second channel information, herein, the first channel information at least includes information indicating N vectors $u_1, u_2 \ldots u_N$, herein N is a natural number which is greater than 1; and the second channel information includes phase value information $\varphi_1, \varphi_2, \ldots \varphi_P$; or includes phase value information $\varphi_1, \varphi_2, \ldots \varphi_P$ and phase value information $\theta_1, \theta_2, \ldots \theta_Q$, herein $N \geq 2$, P is equal to N and Q is equal to N.

All vectors in the first channel information are vectors of a same model.

The vector of the model is $v_i$ or $f(v_i, v_j)$, herein, $v_i = [1 \ e^{j\phi_i} \ L \ e^{j(n-1)\phi_i}]^H$, $v_j = [e^{j\phi_j} \ L \ e^{j(n-1)\phi_j}]^H$, m and n are integers which are greater than 1, and $\phi_i, \phi_j$ is any phase value in 0-2 pi; or the vector of the model is $K^*v_i$ or $K^*f(v_i, v_j)$, herein K is any complex number.

The information matrix consists of a plurality of block matrixes, and each block matrix is obtained by a linear function with information in the channel measurement.

The information matrix is $$\begin{bmatrix} F(u_1 \ldots u_N, e^{j\theta_1} \ldots e^{j\theta_N}) & F(u_1 \ldots u_N, e^{j\theta_1} \ldots e^{j\theta_N}) \\ \alpha F(u_1 \ldots u_N, e^{j\theta_1} \ldots e^{j\theta_N}) & -\alpha F(u_1 \ldots u_N, e^{j\theta_1} \ldots e^{j\theta_N}) \end{bmatrix},$$

herein F is a preset function and the information matrix can also be expressed as $$K^* \begin{bmatrix} \sum_{i=1}^{N} e^{j\theta_i} u_i & \sum_{i=1}^{N} e^{j\theta_i} u_i \\ a \sum_{i=1}^{N} e^{j\theta_i} u_i & -a \sum_{i=1}^{N} e^{j\theta_i} u_i \end{bmatrix},$$

herein K is a complex number; and a is a complex number and a value of a is 1, or −1, or j, or −j, or (1+j)/sqrt2, or (1−j)/sqrt2, or (−1+j)/sqrt2 or (−1−j)/sqrt2, herein sqrt denotes a square root operator.

The information matrix is $$\begin{bmatrix} F(u_1 \ldots u_N, e^{j\theta_1} \ldots e^{j\theta_{N-1}}) & F(u_1 \ldots u_N, e^{j\theta_1} \ldots e^{j\theta_{N-1}}) \\ \alpha F(u_1 \ldots u_N, e^{j\theta_1} \ldots e^{j\theta_{N-1}}) & -\alpha F(u_1 \ldots u_N, e^{j\theta_1} \ldots e^{j\theta_{N-1}}) \end{bmatrix},$$

herein F is a preset function and the information matrix can also be expressed as $$K^* \begin{bmatrix} u_1 + \sum_{i=2}^{N} e^{j\theta_{i-1}} u_i & u_1 + \sum_{i=2}^{N} e^{j\theta_{i-1}} u_i \\ au_1 + a \sum_{i=2}^{N} e^{j\theta_{i-1}} u_i & -au_1 - a \sum_{i=2}^{N} e^{j\theta_{i-1}} u_i \end{bmatrix}.$$

The information matrix is $$\begin{bmatrix} F(u_1 \ldots u_N, e^{j\theta_1} \ldots e^{j\theta_N}) & F(u_1 \ldots u_N, e^{j\varphi_1} \ldots e^{j\varphi_N}) \\ aF(u_1 \ldots u_N, e^{j\theta_1} \ldots e^{j\theta_N}) & -aF(u_1 \ldots u_N, e^{j\varphi_1} \ldots e^{j\varphi_N}) \end{bmatrix},$$

herein F is a preset function and the information matrix can also be expressed as $$K^* \begin{bmatrix} \sum_{i=1}^{N} e^{j\theta_i} u_i & \sum_{i=1}^{N} e^{j\varphi_i} u_i \\ a \sum_{i=1}^{N} e^{j\theta_i} u_i & -a \sum_{i=1}^{N} e^{j\varphi_i} u_i \end{bmatrix}.$$

The information matrix is $$\begin{bmatrix} F(u_1 \ldots u_N, e^{j\theta_1} \ldots e^{j\theta_{N-1}}) & F(u_1 \ldots u_N, e^{j\varphi_1} \ldots e^{j\varphi_{N-1}}) \\ aF(u_1 \ldots u_N, e^{j\theta_1} \ldots e^{j\theta_{N-1}}) & -aF(u_1 \ldots u_N, e^{j\varphi_1} \ldots e^{j\varphi_{N-1}}) \end{bmatrix},$$

herein F is a preset function and the information matrix can also be expressed as $$K^* \begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a \sum_{i=2}^{N} e^{j\theta_{i-1}} u_i & -au_1 - a \sum_{i=2}^{N} e^{j\varphi_{i-1}} u_i \end{bmatrix}.$$

The second channel information further includes amplitude information $A_1, A_2, \ldots A_P$, or $B_1, B_2, \ldots B_{P-1}$, herein A represents absolute value of time amplitude and B represents relative value of time amplitude.

The information matrix is $$\begin{bmatrix} F\begin{pmatrix} u_1 \ldots u_N, e^{j\theta_1} \ldots e^{j\theta_N}, \\ A_1 \ldots A_N \end{pmatrix} & F\begin{pmatrix} u_1 \ldots u_N, e^{j\theta_1} \ldots e^{j\theta_N}, \\ A_1 \ldots A_N \end{pmatrix} \\ aF\begin{pmatrix} u_1 \ldots u_N, e^{j\theta_1} \ldots e^{j\theta_N}, \\ A_1 \ldots A_N \end{pmatrix} & -aF\begin{pmatrix} u_1 \ldots u_N, e^{j\theta_1} \ldots e^{j\theta_N}, \\ A_1 \ldots A_N \end{pmatrix} \end{bmatrix},$$

herein F is a preset function and the information matrix can also be expressed as $$K^* \begin{bmatrix} \sum_{i=1}^{N} A_i e^{j\theta_i} u_i & \sum_{i=1}^{N} A_i e^{j\theta_i} u_i \\ a\sum_{i=1}^{N} A_i e^{j\theta_i} u_i & -a\sum_{i=1}^{N} A_i e^{j\theta_i} u_i \end{bmatrix}.$$

The information matrix is $$\begin{bmatrix} F\begin{pmatrix} u_1 \ldots u_N, e^{j\theta_1} \ldots e^{j\theta_{N-1}}, \\ B_1 \ldots B_{N-1} \end{pmatrix} & F\begin{pmatrix} u_1 \ldots u_N, e^{j\theta_1} \ldots e^{j\theta_N}, \\ B_1 \ldots B_{N-1} \end{pmatrix} \\ aF\begin{pmatrix} u_1 \ldots u_N, e^{j\theta_1} \ldots e^{j\theta_{N-1}}, \\ B_1 \ldots B_{N-1} \end{pmatrix} & -aF\begin{pmatrix} u_1 \ldots u_N, e^{j\theta_1} \ldots e^{j\theta_N}, \\ B_1 \ldots B_{N-1} \end{pmatrix} \end{bmatrix},$$

herein F is a preset function and the information matrix can also be expressed as $$K^* \begin{bmatrix} u_1 + \sum_{i=2}^{N} B_{i-1} e^{j\theta_{i-1}} u_i & u_1 + \sum_{i=2}^{N} B_{i-1} e^{j\theta_{i-1}} u_i \\ au_1 + a\sum_{i=2}^{N} B_{i-1} e^{j\theta_{i-1}} u_i & -au_1 - a\sum_{i=2}^{N} B_{i-1} e^{j\theta_{i-1}} u_i \end{bmatrix}.$$

The information matrix is $$\begin{bmatrix} F\begin{pmatrix} u_1 \ldots u_N, e^{j\theta_1} \ldots e^{j\theta_N}, \\ A_1 \ldots A_N \end{pmatrix} & F\begin{pmatrix} u_1 \ldots u_N, e^{j\varphi_1} \ldots e^{j\varphi_N}, \\ A_1 \ldots A_N \end{pmatrix} \\ aF\begin{pmatrix} u_1 \ldots u_N, e^{j\theta_1} \ldots e^{j\theta_N}, \\ A_1 \ldots A_N \end{pmatrix} & -aF\begin{pmatrix} u_1 \ldots u_N, e^{j\varphi_1} \ldots e^{j\varphi_N}, \\ A_1 \ldots A_N \end{pmatrix} \end{bmatrix},$$

herein F is a preset function and the information matrix can also be expressed as $$K^* \begin{bmatrix} \sum_{i=1}^{N} e^{j\theta_i} A_i u_i & \sum_{i=1}^{N} e^{j\varphi_i} A_i u_i \\ a\sum_{i=1}^{N} e^{j\theta_i} A_i u_i & -a\sum_{i=1}^{N} e^{j\varphi_i} A_i u_i \end{bmatrix}.$$

The information matrix is $$\begin{bmatrix} F\begin{pmatrix} u_1 \ldots u_N, e^{j\theta_1} \ldots e^{j\theta_{N-1}}, \\ B_1 \ldots B_{N-1} \end{pmatrix} & F\begin{pmatrix} u_1 \ldots u_N, e^{j\varphi_1} \ldots e^{j\varphi_{N-1}}, \\ B_1 \ldots B_{N-1} \end{pmatrix} \\ aF\begin{pmatrix} u_1 \ldots u_N, e^{j\theta_1} \ldots e^{j\theta_{N-1}}, \\ B_1 \ldots B_{N-1} \end{pmatrix} & -aF\begin{pmatrix} u_1 \ldots u_N, e^{j\varphi_1} \ldots e^{j\varphi_{N-1}}, \\ B_1 \ldots B_{N-1} \end{pmatrix} \end{bmatrix},$$

herein F is a preset function and the information matrix can also be expressed as $$K^* \begin{bmatrix} u_1 + \sum_{i=2}^{N} e^{j\theta_{i-1}} B_{i-1} u_i & u_1 + \sum_{i=2}^{N} e^{j\varphi_{i-1}} B_{i-1} u_i \\ au_1 + a\sum_{i=2}^{N} e^{j\theta_{i-1}} B_{i-1} u_i & -au_1 - a\sum_{i=2}^{N} e^{j\varphi_{i-1}} B_{i-1} u_i \end{bmatrix}.$$

The function is set according to a pre-appointment between the base station and the terminal; or the function is set and determined by the terminal and the terminal feeds back the determined function to the base station.

Including phase value information $\varphi_1, \varphi_2, \ldots \varphi_P$ is different from including phase value information $\varphi_1, \varphi_2, \ldots \varphi_P$ and phase value information $\theta_1, \theta_2, \ldots \theta_Q$.

The value of the N or the second channel information is notified to the terminal by the base station through UE specific signaling; or the N or the second channel information is judged and fed back by the terminal to the base station.

The signaling is high layer signaling and is applied to periodic feedback;

the signaling is physical layer control signaling, is transmitted together with aperiodic feedback trigger signaling and is applied to aperiodic feedback.

The embodiment of the present invention further provides a base station, configured to construct quantization information which indicates a quantitative model of a characteristic vector of a channel matrix according to the channel matrix.

The base station is further configured to transmit a channel measurement pilot to a terminal.

The channel matrix consists of a plurality of block matrixes, and each block matrix is obtained by a linear function with information in a channel measurement.

The embodiment of the present invention further provides a terminal, configured to perform channel measurement, construct an information matrix according to a preset function, determine quantified channel parameters and feed back the channel parameters to a base station, the information matrix used for representing channel information.

The channel matrix consists of a plurality of block matrixes, and each block matrix is obtained by a linear function with information in the channel measurement.

The channel information obtained through the channel measurement includes first channel information and second channel information, herein the first channel information at least includes information indicating N vectors $u_1, u_2 \ldots u_N$, herein N is a natural number which is greater than 1; and the second channel information includes phase value information $\varphi_1, \varphi_2, \ldots \varphi_P$; or includes phase value information $\varphi_1, \varphi_2, \ldots \varphi_P$ and phase value information $\theta_1, \theta_2, \ldots \theta_Q$, herein N$>=$2, P is equal to N and Q is equal to N.

The second channel information further includes amplitude information $A_1, A_2, \ldots A_P$, or $B_1, B_2, \ldots B_{P-1}$, herein A represents absolute value of time amplitude and B represents relative value of time amplitude.

Compared with the existing art, the technical solution of the embodiments of the present invention includes: a terminal performs channel measurement, constructs an information matrix according to a preset function, determines quantified channel parameters and feeds back the channel parameters to a base station, the information matrix used for representing channel information; and the base station constructs quantization information which indicates a quantitative model of a characteristic vector of a channel matrix according to the channel matrix. In the technical solution provided by the embodiment of the present invention, since the most essential characteristic of a dual-polarized channel, i.e., information u that represents a multipath direction, is matched in the channel matrix, channel information feedback with the lowest cost is implemented, and compared with the codebook feedback solution in the existing art, on the basis that feedback precision is satisfied, the feedback overhead is obviously reduced, terminal implementation complexity is reduced and feedback efficiency is improved. Therefore, the method for channel information feedback provided by the embodiment of the present invention is applicable to a system based on a Massive MIMO technique.

Other features and advantages of the embodiments of the present invention will be described in subsequent description, and partially become obvious from the description or can be understood by implementing the present invention. The purposes and other advantages of the embodiments of the present invention can be realized and achieved through structures specially pointed out in the description, claims and drawings.

BRIEF DESCRIPTION OF THE DRAWINGS

The drawings described here are used for providing further understanding about the present invention and form a part of the present application. Exemplary embodiments of the present invention and the description thereof are used for explaining the present invention instead of constituting improper limitation to the present invention. In the drawings.

PREFERRED EMBODIMENTS OF THE INVENTION

In order to enable the purposes, technical solution and advantages of the present invention to be clearer, the embodiments of the present invention will be described below in detail in combination with the drawings. It needs to be stated that the embodiments and the features of the embodiments in the present application can be freely combined under the situation of no conflict.

Figure 1:
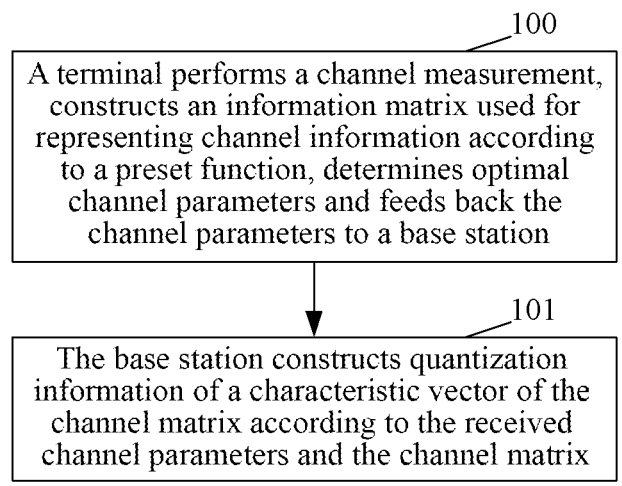
FIG. 1 is a flowchart of a method for channel information feedback in the embodiment of the present invention.

FIG. 1 is a flowchart of a method for channel information feedback in the embodiment of the present invention. As shown in FIG. 1, the method for channel information feedback includes:

In Step 100, a terminal performs channel measurement, constructs an information matrix according to a preset function, determines quantified channel parameters and feeds back optimal channel parameters to a base station, the information matrix used for representing channel information.

Herein, the information for representing the channel includes information indicating a multipath direction.

Before this step, the method further includes: the base station transmits a channel measurement pilot, and the terminal obtains pilot configuration information transmitted by the base station, and performs a channel detection at a corresponding resource position. Specific implementation is a common technical means used by one skilled in the art and thus is not repetitively described here.

In this step, through channel measurement, first channel information and second channel information can be obtained; herein the first channel information at least includes information indicating N vectors $u_1, u_2 \ldots u_N$, herein u is information indicating the multipath direction and N is a natural number which is greater than 1.

Vectors in the first channel information are vectors of the same model. Preferably, the vector can be one of the following model vectors $v_i$ or $f(v_i, v_j)$, herein $v_i=[1 \; e^{j\phi_i} \; L \; e^{j(n-1)\phi_i}]^H$, $v_j=[e^{j\phi_j} \; L \; e^{j(n-1)\phi_j}]^H$, m and n are integers which are greater than 1, $\phi_i, \phi_j$ are 0-2 pi, herein pi denotes any phase value in a circumference-to-diameter ratio. It needs to be stated that the vector in the first channel information may be multiplied by any complex number, and as a result, a vector after being multiplied is equivalent to the original vector. For example, a vector of the model is $K^*v_i$ or $K^*f(v_i, v_j)$, herein k is any complex number.

The second channel information includes randomly generated phase value information $\varphi_1, \varphi_2, \ldots \varphi_P$ caused by a time delay in a multipath channel, or includes phase value information $\varphi_1, \varphi_2, \ldots \varphi_P$ and randomly generated phase value information $\theta_1, \theta_2, \ldots \theta_Q$ caused by different polarization characteristics of multiple antennas, herein N>=2, P is less than or equal to N, and Q is less than or equal to N.

In this step, the function is set according to the pre-appointment between the base station and the terminal; or the function is set and determined by the terminal and the terminal feeds back the determined function to the base station.

In this step, including phase value information $\varphi_1, \varphi_2 \ldots \varphi_P$ caused by a time delay in a multipath channel is different including phase value information $\varphi_1, \varphi_2, \ldots \varphi_P$ and phase value information $\theta_1, \theta_2, \ldots \theta_Q$ caused by different polarization characteristics of multiple antennas.

In this step, the value of N or the second channel information is notified to the terminal by the base station through UE specific signaling; or the N or the second channel information is judged and fed back by the terminal to the base station, herein the signaling is high layer signaling and is applied to periodic feedback; the signaling is physical layer control signaling, is transmitted together with aperiodic feedback trigger signaling and is applied to aperiodic feedback.

In this step, the information matrix consists of a plurality of block matrixes, and each block matrix is obtained by a linear function with information indicating the multipath direction in a channel measurement. Specifically, (1) the information matrix can be $$\begin{bmatrix} F(u_1 \ldots u_N, e^{j\theta_1} \ldots e^{j\theta_N}) & F(u_1 \ldots u_N, e^{j\theta_1} \ldots e^{j\theta_N}) \\ aF(u_1 \ldots u_N, e^{j\theta_1} \ldots e^{j\theta_N}) & -aF(u_1 \ldots u_N, e^{j\theta_1} \ldots e^{j\theta_N}) \end{bmatrix},$$

herein F is a preset function and the information matrix can also be expressed as $$F \text{ is } K^* \begin{bmatrix} \sum_{i=1}^{N} e^{j\theta_i} u_i & \sum_{i=1}^{N} e^{j\theta_i} u_i \\ a\sum_{i=1}^{N} e^{j\theta_i} u_i & -a\sum_{i=1}^{N} e^{j\theta_i} u_i \end{bmatrix},$$

herein K is a complex number; and a is a complex number and is preferably 1, or −1, or j, or −j, or (1+j)/sqrt2, or (1−j)/sqrt2, or (−1+j)/sqrt2 or (−1−j)/sqrt2, herein sqrt denotes a square root operator and j denotes an imaginary part of a complex number;

(2) the information matrix can be $$\begin{bmatrix} F(u_1 \ldots u_N, e^{j\theta_1} \ldots e^{j\theta_{N-1}}) & F(u_1 \ldots u_N, e^{j\theta_1} \ldots e^{j\theta_{N-1}}) \\ aF(u_1 \ldots u_N, e^{j\theta_1} \ldots e^{j\theta_{N-1}}) & -aF(u_1 \ldots u_N, e^{j\theta_1} \ldots e^{j\theta_{N-1}}) \end{bmatrix},$$

herein F is a preset function and the information matrix can also be expressed as $$K^* \begin{bmatrix} u_1 + \sum_{i=2}^{N} e^{j\theta_{i-1}} u_i & u_1 + \sum_{i=2}^{N} e^{j\theta_{i-1}} u_i \\ au_1 + a\sum_{i=2}^{N} e^{j\theta_{i-1}} u_i & -au_1 - a\sum_{i=2}^{N} e^{j\theta_{i-1}} u_i \end{bmatrix};$$

(3) the information matrix can be $$\begin{bmatrix} F(u_1 \ldots u_N, e^{j\theta_1} \ldots e^{j\theta_N}) & F(u_1 \ldots u_N, e^{j\varphi_1} \ldots e^{j\varphi_N}) \\ aF(u_1 \ldots u_N, e^{j\theta_1} \ldots e^{j\theta_N}) & -aF(u_1 \ldots u_N, e^{j\varphi_1} \ldots e^{j\varphi_N}) \end{bmatrix},$$

herein F is a preset function and the information matrix can also be expressed as $$K^* \begin{bmatrix} \sum_{i=1}^{N} e^{j\theta_i} u_i & \sum_{i=1}^{N} e^{j\varphi_i} u_i \\ a\sum_{i=1}^{N} e^{j\theta_i} u_i & -a\sum_{i=1}^{N} e^{j\varphi_i} u_i \end{bmatrix};$$

(4) the information matrix can be $$\begin{bmatrix} F(u_1 \ldots u_N, e^{j\theta_1} \ldots e^{j\theta_{N-1}}) & F(u_1 \ldots u_N, e^{j\varphi_1} \ldots e^{j\varphi_{N-1}}) \\ aF(u_1 \ldots u_N, e^{j\theta_1} \ldots e^{j\theta_{N-1}}) & -aF(u_1 \ldots u_N, e^{j\varphi_1} \ldots e^{j\varphi_{N-1}}) \end{bmatrix},$$

herein F is a preset function and the information matrix can also be expressed as $$K^* \begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix}.$$

In this step, the second channel information may further include amplitude information $A_1, A_2 \ldots A_P$, or $B_1, B_2 \ldots B_{P-1}$, herein A represents absolute value of time amplitude and B represents relative value of time amplitude. At this moment, specifically, (5) the information matrix can further be $$\begin{bmatrix} F\begin{pmatrix} u_1 \ldots u_N, e^{j\theta_1} \ldots e^{j\theta_N}, \\ A_1 \ldots A_N \end{pmatrix} & F\begin{pmatrix} u_1 \ldots u_N, e^{j\theta_1} \ldots e^{j\theta_N}, \\ A_1 \ldots A_N \end{pmatrix} \\ aF\begin{pmatrix} u_1 \ldots u_N, e^{j\theta_1} \ldots e^{j\theta_N}, \\ A_1 \ldots A_N \end{pmatrix} & -aF\begin{pmatrix} u_1 \ldots u_N, e^{j\theta_1} \ldots e^{j\theta_N}, \\ A_1 \ldots A_N \end{pmatrix} \end{bmatrix},$$

herein F is a preset function and the information matrix can also be expressed as $$K^* \begin{bmatrix} \sum_{i=1}^{N} A_i e^{j\theta_i} u_i & \sum_{i=1}^{N} A_i e^{j\theta_i} u_i \\ a\sum_{i=1}^{N} A_i e^{j\theta_i} u_i & -a\sum_{i=1}^{N} A_i e^{j\theta_i} u_i \end{bmatrix};$$

(6) the information matrix may further be $$\begin{bmatrix} F\begin{pmatrix} u_1 \ldots u_N, e^{j\theta_1} \ldots e^{j\theta_{N-1}}, \\ B_1 \ldots B_{N-1} \end{pmatrix} & F\begin{pmatrix} u_1 \ldots u_N, e^{j\theta_1} \ldots e^{j\theta_N}, \\ B_1 \ldots B_{N-1} \end{pmatrix} \\ aF\begin{pmatrix} u_1 \ldots u_N, e^{j\theta_1} \ldots e^{j\theta_{N-1}}, \\ B_1 \ldots B_{N-1} \end{pmatrix} & -aF\begin{pmatrix} u_1 \ldots u_N, e^{j\theta_1} \ldots e^{j\theta_N}, \\ B_1 \ldots B_{N-1} \end{pmatrix} \end{bmatrix},$$

herein F is a preset function and the information matrix can also be expressed as $$K^* \begin{bmatrix} u_1 + \sum_{i=2}^{N} B_{i-1} e^{j\theta_{i-1}} u_i & u_1 + \sum_{i=2}^{N} B_{i-1} e^{j\theta_{i-1}} u_i \\ au_1 + a\sum_{i=2}^{N} B_{i-1} e^{j\theta_{i-1}} u_i & -au_1 - a\sum_{i=2}^{N} B_{i-1} e^{j\theta_{i-1}} u_i \end{bmatrix};$$

(7) the information matrix may further be $$\begin{bmatrix} F\begin{pmatrix} u_1 \ldots u_N, e^{j\theta_1} \ldots e^{j\theta_N}, \\ A_1 \ldots A_N \end{pmatrix} & F\begin{pmatrix} u_1 \ldots u_N, e^{j\varphi_1} \ldots e^{j\varphi_N}, \\ A_1 \ldots A_N \end{pmatrix} \\ aF\begin{pmatrix} u_1 \ldots u_N, e^{j\theta_1} \ldots e^{j\theta_N}, \\ A_1 \ldots A_N \end{pmatrix} & -aF\begin{pmatrix} u_1 \ldots u_N, e^{j\varphi_1} \ldots e^{j\varphi_N}, \\ A_1 \ldots A_N \end{pmatrix} \end{bmatrix},$$

herein F is a preset function and the information matrix can also be expressed as $$K^* \begin{bmatrix} \sum_{i=1}^{N} e^{j\theta_i} A_i u_i & \sum_{i=1}^{N} e^{j\varphi_i} A_i u_i \\ a\sum_{i=1}^{N} e^{j\theta_i} A_i u_i & -a\sum_{i=1}^{N} e^{j\varphi_i} A_i u_i \end{bmatrix};$$

(8) the information matrix may further be $$\begin{bmatrix} F\begin{pmatrix} u_1 \ldots u_N, e^{j\theta_1} \ldots e^{j\theta_{N-1}}, \\ B_1 \ldots B_{N-1} \end{pmatrix} & F\begin{pmatrix} u_1 \ldots u_N, e^{j\varphi_1} \ldots e^{j\varphi_{N-1}}, \\ B_1 \ldots B_{N-1} \end{pmatrix} \\ aF\begin{pmatrix} u_1 \ldots u_N, e^{j\theta_1} \ldots e^{j\theta_{N-1}}, \\ B_1 \ldots B_{N-1} \end{pmatrix} & -aF\begin{pmatrix} u_1 \ldots u_N, e^{j\varphi_1} \ldots e^{j\varphi_{N-1}}, \\ B_1 \ldots B_{N-1} \end{pmatrix} \end{bmatrix},$$

herein F is a preset function and the information matrix can also be expressed as $$K^* \begin{bmatrix} u_1 + \sum_{i=2}^{N} e^{j\theta_{i-1}} B_{i-1} u_i & u_1 + \sum_{i=2}^{N} e^{j\varphi_{i-1}} B_{i-1} u_i \\ au_1 + a\sum_{i=2}^{N} e^{j\theta_{i-1}} B_{i-1} u_i & -au_1 - a\sum_{i=2}^{N} e^{j\varphi_{i-1}} B_{i-1} u_i \end{bmatrix}.$$

Determining the optimal channel parameters in step 100 is finding a group of optimal parameters in variable parameters of a variation model. Here, an optimal judgment criterion is generally maximum capacity or minimum error, etc. Specific implementation is a common technical means used by one skilled in the art and thus is not repetitively described here.

In the present invention, since the most essential characteristic of a dual-polarized channel, i.e., information u that represents a multipath direction, is matched in the channel matrix, channel information feedback at the lowest cost is implemented, and compared with the existing codebook feedback solution, on the basis that feedback precision is satisfied, the feedback overhead is obviously reduced, terminal implementation complexity is reduced and feedback efficiency is improved. Therefore, the method for channel information feedback provided by the embodiment of the present invention is applicable to a system based on a Massive MIMO technique.

In Step 101, the base station constructs quantization information which indicates a quantitative model of a characteristic vector of a channel matrix according to the channel matrix.

The method provided by the embodiments of the present invention will be described below in detail in combination with the specific embodiments.

Embodiment 1: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas.

In embodiment 1, it is supposed that the terminal and the base station pre-appoint to use the following function to represent the characteristic vector information of the channel matrix:

$$\begin{bmatrix} \sum_{i=1}^{N} e^{j\theta_i} u_i & \sum_{i=1}^{N} e^{j\varphi_i} u_i \\ a\sum_{i=1}^{N} e^{j\theta_i} u_i & -a\sum_{i=1}^{N} e^{j\varphi_i} u_i \end{bmatrix},$$

herein a is one of pre-appointed fixed values 1, −1, j and −j, and N is a fixed value such as 2, 3 or 4, and may also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$ and the optimal values of $\theta_1 \ldots \theta_N$ in the function of this embodiment according to the channel matrix of (Nr×Nt) dimensions, and feeds back the values to the base station. Here, for $u_1 \ldots u_N$, broadband feedback and long-time feedback may be performed, and for $\theta_1 \ldots \theta_N$, sub-band feedback and short-time feedback may be performed.

The base station constructs quantization information which indicates a quantitative model of the characteristic vector of the channel matrix according to the received $u_1 \ldots u_N$ and $\theta_1 \ldots \theta_N$ information and the appointed function of this embodiment, and may use the quantization information which indicates a quantitative model for downlink channel precoding.

Embodiment 2: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas.

In embodiment 2, it is supposed that the terminal and the base station pre-appoint to use the following function to represent the characteristic vector information of the channel matrix:

$$\begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix},$$

herein a is one of pre-appointed fixed values 1, −1, j and −j, and N is a fixed value such as 2, 3 or 4, and may also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$ and the optimal values of $\theta_1 \ldots \theta_{N-1}$ in the function of this embodiment according to the channel matrix of (Nr×Nt) dimensions, and feeds back the values to the base station. Here, for $u_1 \ldots u_N$, broadband feedback and long-time feedback may be performed, and for $\theta_1 \ldots \theta_{N-1}$, sub-band feedback and short-time feedback may be performed.

The base station constructs quantization information which indicates a quantitative model of the characteristic vector of the channel matrix according to the received $u_1 \ldots u_N$ and $\theta_1 \ldots \theta_{N-1}$ information and the appointed function of this embodiment, and may use the quantization information which indicates a quantitative model for downlink channel precoding.

Embodiment 3: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas.

In embodiment 3, it is supposed that the terminal and the base station pre-appoint to use the following function to represent the characteristic vector information of the channel matrix:

$$\begin{bmatrix} \sum_{i=1}^{N} e^{j\theta_i} u_i & \sum_{i=1}^{N} e^{j\varphi_i} u_i \\ a\sum_{i=1}^{N} e^{j\theta_i} u_i & -a\sum_{i=1}^{N} e^{j\varphi_i} u_i \end{bmatrix},$$

herein a is one of pre-appointed fixed values 1, −1, j and −j, and N is a fixed value such as 2, 3 or 4, and may also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$ and the optimal values of $\theta_1 \ldots \theta_N$, $\varphi_1 \ldots \varphi_N$ in the function of this embodiment according to the channel matrix of (Nr×Nt) dimensions, and feeds back the values to the base station. Here, for $u_1 \ldots u_N$, broadband feedback and long-time feedback may be performed, and for $\theta_1 \ldots \theta_N$, $\varphi_1 \ldots \varphi_N$, sub-band feedback and short-time feedback may be performed.

The base station constructs quantization information which indicates a quantitative model of the characteristic vector of the channel matrix according to the received $u_1 \ldots u_N$ and $\theta_1 \ldots \theta_N$, $\varphi_1 \ldots \varphi_N$ information and the appointed function of this embodiment, and may use the quantifying information for downlink channel precoding, herein values of $\theta_1 \ldots \theta_N$, $\varphi_1 \ldots \varphi_N$ are 0-2 pi.

Embodiment 4: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas. In embodiment 4, it is supposed that the terminal and the base station pre-appoint to use the following function to represent the characteristic vector information of the channel matrix:

$$\begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix},$$

herein a is one of pre-appointed fixed values 1, −1, j and −j, and N is a fixed value such as 2, 3 or 4, and may also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$ and the optimal values of $\theta_1 \ldots \theta_{N-1}$, $\varphi_1 \ldots \varphi_{N-1}$ in the function of this embodiment according to the channel matrix of (Nr×Nt) dimensions, and feeds back the values to the base station. Here, for $u_1 \ldots u_N$, broadband feedback and long-time feedback may be performed, and for $\theta_1 \ldots \theta_{N-1}$, $\varphi_1 \ldots \varphi_{N-1}$, sub-band feedback and short-time feedback may be performed.

The base station constructs quantization information which indicates a quantitative model of the characteristic vector of the channel matrix according to the received $u_1 \ldots u_N$ and $\theta_1 \ldots \theta_{N-1}$, $\varphi_1 \ldots \varphi_{N-1}$ information and the appointed function of this embodiment, and may use the quantization information which indicates a quantitative model for downlink channel precoding.

Embodiment 5: for the above-mentioned embodiment in the embodiment 4, a is a non-fixed value, the terminal and the base station pre-appoint to use the following function to represent the characteristic vector information of the channel matrix:

$$\begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix},$$

herein a is one of 1 and j or one of 1, j, (1+j)/sqrt2 and (1−j)sqrt2. This function can be fixedly multiplied by a complex number scalar K, the represented characteristic vector direction information is unchanged and no influence is caused to information contained therein. Normalization is performed at the base station side.

The terminal selects the optimal value of $u_1 \ldots u_N$ and the optimal values of $\theta_1 \ldots \theta_{N-1}$, $\varphi_1 \ldots \varphi_{N-1}$ and the value of a in the function of this embodiment according to the channel matrix with (Nr×Nt) dimensions, and feeds back the values to the base station. Here, for $u_1 \ldots u_N$, broadband feedback and long-time feedback may be performed, and for the value of a and $\theta_1 \ldots \theta_{N-1}$, $\varphi_1 \ldots \varphi_{N-1}$, sub-band feedback and short-time feedback may be performed, herein a is determined according to the channel matrix, if the value of a is optimal, that a will be determined, and a is jointly selected with other parameters.

The base station constructs quantization information which indicates a quantitative model of the characteristic vector of the channel matrix according to the received $u_1 \ldots u_N$, $\theta_1 \ldots \theta_{N-1}$, $\varphi_1 \ldots \varphi_{N-1}$ information, the value information of a and the appointed function of this embodiment, and may use the quantization information which indicates a quantitative model for downlink channel precoding.

It needs to be stated that the situation that a is a non-fixed value in this embodiment is also applicable to embodiment 1, embodiment 2 and embodiment 3, and thus is not repetitively described here.

Embodiment 6: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs channel detection at a corresponding resource position. Channel matrix information of (Nr× Nt) dimensions is obtained, herein Nr is the number of receiving antennas.

In embodiment 6, it is supposed that the terminal and the base station pre-appoint to use the following function to represent the characteristic vector information of the channel matrix:

$$\begin{bmatrix} \sum_{i=1}^{N} A_i e^{j\theta_i} u_i & \sum_{i=1}^{N} A_i e^{j\theta_i} u_i \\ a \sum_{i=1}^{N} A_i e^{j\theta_i} u_i & -a \sum_{i=1}^{N} A_i e^{j\theta_i} u_i \end{bmatrix},$$

herein a is one of pre-appointed fixed values 1, −1, j and −j, and N is a fixed value such as 2, 3 or 4, and may also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$, $A_1 \ldots A_N$ and the optimal values of $\theta_1 \ldots \theta_N$ in the function of this embodiment according to the channel matrix of (Nr×Nt) dimensions, and feeds back the values to the base station. Here, for $u_1 \ldots u_N$, $A \ldots A_N$, broadband feedback and long-time feedback may be performed, and for $\theta_1 \ldots \theta_N$, sub-band feedback and short-time feedback may be performed.

The base station constructs quantization information which indicates a quantitative model of the characteristic vector of the channel matrix according to the received $u_1 \ldots u_N$, $A_1 \ldots A_N$ and $\theta_1 \ldots \theta_N$ information and the appointed function of this embodiment, and may use the $u_1 \ldots u_N$ information for downlink channel precoding.

Embodiment 7: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas.

In embodiment 7, it is supposed that the terminal and the base station pre-appoint to use the following function to represent the characteristic vector information of the channel matrix:

$$\begin{bmatrix} u_1 + \sum_{i=2}^{N} B_{i-1} e^{j\theta_{i-1}} u_i & u_1 + \sum_{i=2}^{N} B_{i-1} e^{j\theta_{i-1}} u_i \\ a u_1 + a \sum_{i=2}^{N} B_{i-1} e^{j\theta_{i-1}} u_i & -a u_1 - a \sum_{i=2}^{N} B_{i-1} e^{j\theta_{i-1}} u_i \end{bmatrix},$$

herein a is one of pre-appointed fixed values 1, −1, j and −j, and N is a fixed value such as 2, 3 or 4, and may also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$, $B_1 \ldots B_{N-1}$ and the optimal values of $\theta_1 \ldots \theta_{N-1}$ in the function of this embodiment according to the channel matrix of (Nr×Nt) dimensions, and feeds back the values to the base station. Here, for $u_1 \ldots u_N$, $B_1 \ldots B_{P-1}$, broadband feedback and long-time feedback may be performed, and for $\theta_1 \ldots \theta_N$, sub-band feedback and short-time feedback may be performed.

The base station constructs quantization information which indicates a quantitative model of the characteristic vector of the channel matrix according to the received $u_1 \ldots u_N$ and $\theta_1 \ldots \theta_{N-1}$ information and the appointed function of this embodiment, and may use the quantization information which indicates a quantitative model for downlink channel precoding.

Embodiment 8: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas.

In embodiment 8, it is supposed that the terminal and the base station pre-appoint to use the following function to represent the characteristic vector information of the channel matrix:

$$\begin{bmatrix} \sum_{i=1}^{N} e^{j\theta_i} A_i u_i & \sum_{i=1}^{N} e^{j\varphi_i} A_i u_i \\ a \sum_{i=1}^{N} e^{j\theta_i} A_i u_i & -a \sum_{i=1}^{N} e^{j\varphi_i} A_i u_i \end{bmatrix},$$

herein a is one of pre-appointed fixed values 1, −1, j and −j, and N is a fixed value such as 2, 3 or 4, and can also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$, $A_1 \ldots A_N$ and the optimal values of $\theta_1 \ldots \theta_N$, $\varphi_1 \ldots \varphi_N$ in the function of this embodiment according to the channel matrix of (Nr×Nt) dimensions, and feeds back the values to the base station. Here, for $u_1 \ldots u_N$, $A_1 \ldots A_N$, broadband feedback and long-time feedback may be performed, and for $\theta_1 \ldots \theta_N$, $\varphi_1 \ldots \varphi_N$, sub-band feedback and short-time feedback may be performed.

The base station constructs quantization information which indicates a quantitative model of the characteristic vector of the channel matrix according to the received $u_1 \ldots u_N$, $A_1 \ldots A_N$ and $\theta_1 \ldots \theta_N$, $\varphi_1 \ldots \varphi_N$ information and the appointed function of this embodiment, and may use the quantization information which indicates a quantitative model for downlink channel precoding, herein values of $\theta_1 \ldots \theta_N$, $\varphi_1 \ldots \varphi_N$ are 0-2 pi.

Embodiment 9: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions are obtained, herein Nr is the number of receiving antennas.

In embodiment 9, it is supposed that the terminal and the base station pre-appoint to use the following function to represent the characteristic vector information of the channel matrix:

$$\begin{bmatrix} u_1 + \sum_{i=2}^{N} e^{j\theta_{i-1}} B_{i-1} u_i & u_1 + \sum_{i=2}^{N} e^{j\varphi_{i-1}} B_{i-1} u_i \\ au_1 + a\sum_{i=2}^{N} e^{j\theta_{i-1}} B_{i-1} u_i & -au_1 - a\sum_{i=2}^{N} e^{j\varphi_{i-1}} B_{i-1} u_i \end{bmatrix},$$

herein a is one of pre-appointed fixed values 1, −1, j and −j, and N is a fixed value such as 2, 3 or 4, and can also be configured by the base station using signaling. This function may be fixedly multiplied by a complex number scalar K, the represented characteristic vector direction information is unchanged and no influence is caused to information contained therein. Normalization is performed at the base station side.

The terminal selects the optimal values of $u_1 \ldots u_N$, $B_1 \ldots B_{N-1}$ and the optimal values of $\theta_1 \ldots \theta_{N-1}$, $\varphi_1 \ldots \varphi_{N-1}$ in the function of this embodiment according to the channel matrix of (Nr×Nt) dimensions, and feeds back the values to the base station. Here, for $u_1 \ldots u_N$, $B_1 \ldots B_{N-1}$, broadband feedback and long-time feedback may be performed, and for $\theta_1 \ldots \theta_{N-1}$, $\varphi_1 \ldots \varphi_{N-1}$, sub-band feedback and short-time feedback may be performed.

The base station constructs quantization information which indicates a quantitative model of the characteristic vector of the channel matrix according to the received $u_1 \ldots u_N$, $B_1 \ldots B_{N-1}$ and $\theta_1 \ldots \theta_{N-1}$, $\varphi_1 \ldots \varphi_{N-1}$ information and the appointed function of this embodiment, and may use the quantization information which indicates a quantitative model for downlink channel precoding.

Embodiment 10: it is as described in embodiment 9, herein a is a non-fixed value.

In embodiment 10, it is supposed that the terminal and the base station pre-appoint to use the following function to represent the characteristic vector information of the channel matrix:

$$\begin{bmatrix} u_1 + \sum_{i=2}^{N} e^{j\theta_{i-1}} B_{i-1} u_i & u_1 + \sum_{i=2}^{N} e^{j\varphi_{i-1}} B_{i-1} u_i \\ au_1 + a\sum_{i=2}^{N} e^{j\theta_{i-1}} B_{i-1} u_i & -au_1 - a\sum_{i=2}^{N} e^{j\varphi_{i-1}} B_{i-1} u_i \end{bmatrix},$$

herein a is one of 1 and j or one of 1, j, (1+j)/sqrt2 and (1−j)/sqrt2. The terminal selects the optimal values of $u_1 \ldots u_N$, $B_1 \ldots B_{N-1}$ and the optimal values of $\theta_1 \ldots \theta_N$, $\varphi_1 \ldots \varphi_N$ and the value of a in the function of this embodiment according to the channel matrix of (Nr×Nt) dimensions, and feeds back the values to the base station. The base station constructs quantization information which indicates a quantitative model of the characteristic vector of the channel matrix according to the received $u_1 \ldots u_N$, $\theta_1 \ldots \theta_N$, $\varphi_1 \ldots \varphi_N$ and $B_1 \ldots B_{N-1}$ information and the value of a and the appointed function of this embodiment, and can use the quantization information which indicates a quantitative model for downlink channel precoding.

It needs to be stated that the situation that a is a non-fixed value is also applicable to embodiment 6, embodiment 7 and embodiment 8, and thus is not repetitively described here.

Embodiment 11: as described in embodiment 10, the value of a may be configured by the base station through signaling, e.g., the value of a is one of 1 and j or one of 1, j, (1+j)/sqrt2 and (1−j)/sqrt2. In other words, the value of a is notified by high layer signaling.

As described in embodiment 6 and embodiment 10, the range of the value of a may be configured by the base station through signaling, e.g., the value of a is one of 1 and j or one of 1, j, (1+j)/sqrt2 and (1−j)sqrt2.

Embodiment 12: as described in embodiment 1 to embodiment 10, the value of N is notified by the base station through UE specific signaling. For periodic feedback on a physical uplink control channel, generally non-triggering-type periodic reporting is adopted and the value of N may be notified by high layer signaling; and for a triggering-type aperiodic feedback mode, transmission through a downlink physical layer control channel may be performed during triggering and simultaneous transmission together with trigger signaling is performed.

Embodiment 13: as described in embodiment 1 to embodiment 10, the used function is notified by the base station through UE specific signaling. For periodic feedback on a physical uplink control channel, generally non-triggering-type periodic reporting is adopted and notification through high layer signaling may be performed; and for a triggering-type aperiodic feedback mode, transmission through a downlink physical layer control channel can be performed during triggering and simultaneous transmission together with trigger signaling is performed.

Embodiment 14: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas. The terminal selects one of the following functions to represent the characteristic vector information of the channel matrix according to the magnitude of channel quantization error and/or uplink feedback capacity:

$$\begin{bmatrix} \sum_{i=1}^{N} e^{j\theta_i} u_i & \sum_{i=1}^{N} e^{j\varphi_i} u_i \\ a\sum_{i=1}^{N} e^{j\theta_i} u_i & -a\sum_{i=1}^{N} e^{j\varphi_i} u_i \end{bmatrix}$$

or $$\begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix}.$$

The terminal selects one function of the above functions according to the channel matrix of (Nr×Nt) dimensions, determines parameters corresponding to the function according to the channel matrix and feeds back the parameters to the base station. The base station constructs quantization information which indicates a quantitative model of the characteristic vector of the channel matrix according to the received parameters and the appointed function, and may use the quantization information which indicates a quantitative model for downlink channel precoding.

Embodiment 15: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas. The terminal selects one of the following functions to represent the characteristic vector information of the channel matrix according to the magnitude of channel quantization error and/or uplink feedback capacity:

$$\begin{bmatrix} \sum_{i=1}^{N} e^{j\theta_i} u_i & \sum_{i=1}^{N} e^{j\varphi_i} u_i \\ a\sum_{i=1}^{N} e^{j\theta_i} u_i & -a\sum_{i=1}^{N} e^{j\varphi_i} u_i \end{bmatrix} \text{ or } \begin{bmatrix} \sum_{i=1}^{N} A_i e^{j\theta_i} u_i & \sum_{i=1}^{N} A_i e^{j\varphi_i} u_i \\ a\sum_{i=1}^{N} A_i e^{j\theta_i} u_i & -a\sum_{i=1}^{N} A_i e^{j\varphi_i} u_i \end{bmatrix}.$$

The terminal selects one function of the above functions according to the channel matrix of (Nr×Nt) dimensions, determines parameters corresponding to the function according to the channel matrix and feeds back the parameters to the base station. The base station constructs quantization information which indicates a quantitative model of the characteristic vector of the channel matrix according to the received parameters and the appointed function, and may use the quantization information which indicates a quantitative model for downlink channel precoding.

Embodiment 16: supposing that the base station transmits a channel measurement pilot, taking Nt antennas as an example, Nt/2 antennas exist in two mutually perpendicular polarization directions respectively. The base station transmits a set of CSI-RS pilots of total Nt ports. The terminal obtains pilot configuration information transmitted by the base station and performs a channel detection at a corresponding resource position. Channel matrix information of (Nr×Nt) dimensions is obtained, herein Nr is the number of receiving antennas. The terminal selects one of the following functions to represent the characteristic vector information of the channel matrix according to the magnitude of channel quantization error and/or uplink feedback capacity:

$$\begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix}, \text{ or }$$

$$\begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix}, \text{ or }$$

$$\begin{bmatrix} u_1 + \sum_{i=2}^{N} e^{j\theta_{i-1}} B_{i-1} u_i & u_1 + \sum_{i=2}^{N} e^{j\varphi_{i-1}} B_{i-1} u_i \\ au_1 + a\sum_{i=2}^{N} e^{j\theta_{i-1}} B_{i-1} u_i & -au_1 - a\sum_{i=2}^{N} e^{j\varphi_{i-1}} B_{i-1} u_i \end{bmatrix}, \text{ or }$$

$$\begin{bmatrix} u_1 + \sum_{i=2}^{N} B_{i-1} e^{j\theta_{i-1}} u_i & u_1 + \sum_{i=2}^{N} B_{i-1} e^{j\varphi_{i-1}} u_i \\ au_1 + a\sum_{i=2}^{N} B_{i-1} e^{j\theta_{i-1}} u_i & -au_1 - a\sum_{i=2}^{N} B_{i-1} e^{j\varphi_{i-1}} u_i \end{bmatrix}.$$

The terminal selects one function of the above functions according to the channel matrix of (Nr×Nt) dimensions, determines parameters corresponding to the function according to the channel matrix and feeds back the parameters to the base station. The base station constructs quantization information which indicates a quantitative model of the characteristic vector of the channel matrix according to the received parameters and the appointed function, and may use the quantization information which indicates a quantitative model for downlink channel precoding.

Embodiment 17: in all above-mentioned embodiments, the following functions can be pre-appointed at the receiving and transmitting ends and these functions are in accord with $v_1$ or $f(v_i, v_j)$, herein $v_i = [1 \ e^{j\Phi_i} \ L \ e^{j(n-1)\Phi_i}]^H$, here n is any integer which is greater than 1. A typical model of $f(v_i, v_j)$ is $f(v_i, v_j) = v_i \otimes v_j$, here $v_i = [1 \ e^{j\Phi_i} \ L \ e^{j(n-1)\Phi_i}]^H$, $v_j = [e^{j\Phi_j} \ L \ e^{j(n-1)\Phi_j}]^H$, and may also be $$f(v_i, v_j) = \begin{bmatrix} v_i \\ v_j \end{bmatrix}.$$

During feedback, the terminal may feed back $\phi_i$ or $\phi_i$, $\phi_j$ information to the base station, m and n are pre-appointed values, at this moment the base station may construct $v_i$ or $v_i$, $v_j$ information according to the above-mentioned parameters and further construct $u_1 \ldots u_N$ information.

Herein, the range of the values of $\phi_i$, $\phi_j$ is 0-2 pi, or the range of the values of $\phi_i$, $\phi_j$ is a subset of 0-2 pi and the range can be configured by the signaling of the base station.

Embodiment 18: part of the all above-mentioned embodiments need to feed back 2 sets of phase parameter information $\theta_1 \ldots \theta_N$, $\varphi_1 \ldots \varphi_N$, preferably, in order to reduce the overhead, at least part of value information of $\varphi_1 \ldots \varphi_N$ is obtained based on performing difference feedback on $\theta_1 \ldots \theta_N$.

Embodiment 19: part of the all above-mentioned embodiments need to feed $\phi_i$, $\phi_j$, herein $\theta_j$ is obtained based on performing differential feedback on $\phi_i$.

Figure 2:
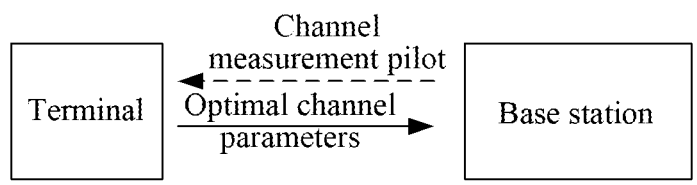
FIG. 2 is a schematic diagram of a component structure of a channel information feedback system in the embodiment of the present invention.

FIG. 2 is a schematic diagram of a component structure of a channel information feedback system in the embodiment of the present invention. As shown in FIG. 2, the channel information feedback system at least includes a base station and a terminal, herein, the terminal is used to perform channel measurement, construct an information matrix according to a preset function, determine quantified channel parameters and feed back the channel parameters to a base station, the information matrix used for representing channel information, herein the information for representing the channel includes information indicating a multipath direction, herein first channel information and second channel information may be obtained when the terminal performs a channel detection, herein the first channel information at least includes information indicating N vectors $u_1, u_2 \ldots u_N$, herein u is information indicating the multipath direction and N is a natural number which is greater than 1; and the second channel information includes phase value information $\varphi_1, \varphi_2, \ldots \varphi_P$ caused by a time delay in a multipath channel, or includes phase value information $\varphi_1, \varphi_2, \ldots \varphi_P$ and phase value information $\theta_1, \theta_2, \ldots \theta_Q$ caused by different polarization characteristics of multiple antennas, herein N>=2, P is equal to N and Q is equal to N; and The second channel information further includes amplitude information $A_1, A_2, \ldots A_P$, or $B_1, B_2, \ldots B_{P-1}$, herein A represents absolute value of time amplitude and B represents relative value of time amplitude.

the base station is used to construct quantization information which indicates a quantitative model of a characteristic vector of a channel matrix according the channel matrix.

The base station is further used to transmit channel measurement pilot to the terminal; and at this moment, the terminal is further used to obtain pilot configuration information transmitted by the base station and perform a channel detection at a corresponding resource position.

Herein, the channel matrix consists of a plurality of block matrixes, and each block matrix is obtained by a linear function with information indicating the multipath direction in a channel measurement. Herein, the function is set according to pre-appointment between the base station and the terminal; or the function is determined by the terminal and the terminal feeds back the determined function to the base station.

The embodiment of the present invention further provides a base station, which is used to construct quantization information which indicates a quantitative model of a characteristic vector of a channel matrix according to channel matrix, and is further used to transmit channel measurement pilot to a terminal.

Herein, the channel matrix consists of a plurality of block matrixes, and each block matrix is obtained by a linear function with information indicating a multipath direction in a channel measurement.

The embodiment of the present invention further provides a terminal, which is used to perform channel measurement, construct an information matrix according to a preset function, determine quantified channel parameters and feed back the channel parameters to a base station, the information matrix used for representing channel information, herein the information for representing the channel includes information indicating a multipath direction.

Herein, the channel matrix consists of a plurality of block matrixes, and each block matrix is obtained by a linear function with information indicating a multipath direction in a channel measurement through.

Herein, channel information obtained through channel detection includes first channel information and second channel information, herein the first channel information at least includes information indicating N vectors $u_1, u_2 \ldots u_N$, herein u is information indicating the multipath direction and N is a natural number which greater than 1; and the second channel information includes phase value information $\varphi_1, \varphi_2, \ldots \varphi_P$ caused by a time delay in a multipath channel, or includes phase value information $\varphi_1, \varphi_2, \ldots \varphi_P$ and phase value information $\theta_1, \theta_2, \ldots \theta_Q$ caused by different polarization characteristics of multiple antennas, herein N>=2, P is equal to N and Q is equal to N.

The second channel information further includes amplitude information $A_1, A_2, \ldots A_P$, or $B_1, B_2, \ldots B_{P-1}$, herein A represents absolute value of time amplitude and B represents relative value of time amplitude.

The described embodiments are just preferred embodiments of the present invention and are not used for limiting the protection range of the present invention. Any modification, equivalent replacement, improvement and the like made within the rule and principle of the present invention shall also be included in the protection range of the present invention.

INDUSTRIAL APPLICABILITY

The embodiments of the present invention provide a method for channel information feedback, a base station and a terminal, herein the method includes: a terminal performs channel measurement, constructs an information matrix according to a preset function, determines quantified channel parameters and feeds back the channel parameters to a base station, the information matrix used for representing channel information; and the base station constructs quantization information which indicates a quantitative model of a characteristic vector of a channel matrix according to the channel matrix. In the technical solution provided by the embodiment of the present invention, since the most essential characteristic of a dual-polarized channel, i.e., information u that represents a multipath direction, is matched in the channel matrix, channel information feedback with the lowest cost is implemented, and compared with the codebook feedback solution in the related art, on the basis that feedback precision is satisfied, the feedback overhead is obviously reduced, terminal implementation complexity is reduced and feedback efficiency is improved. Therefore, the method for channel information feedback provided by the embodiment of the present invention is applicable to a system based on a Massive MIMO technique.

What is claimed is:

1. A method for channel information feedback, comprising:
    a terminal performing channel measurement, constructing an information matrix according to a preset function, determining quantified channel parameters and feeding back the channel parameters to a base station, the information matrix used for representing channel information;
    the base station deriving precoding weights to be used for transmitting to the terminal based on quantified channel information; wherein the quantified channel information is derived based on the quantified channel parameters and the information matrix used by terminal; and the base station transmitting to the terminal using the derived weights;

wherein the information matrix consists of a plurality of block matrixes, and each block matrix is obtained by a linear combination of vectors in N vectors $u_1, u_2 \ldots u_N$, wherein u is a vector.

2. The method for channel information feedback according to claim 1, wherein the channel information comprises first channel information and second channel information, wherein, the first channel information at least comprises information indicating the N vectors $u_1, u_2 \ldots u_N$; and the second channel information comprises phase value information $\varphi_1, \varphi_2, \ldots \varphi_P$; or comprises phase value information $\varphi_1, \varphi_2, \ldots \varphi_P$ and phase value information $\theta_1, \theta_2, \ldots \theta_Q$ $\theta_1, \theta_2, \ldots \theta_Q$, wherein $N>=2$, P is equal to N and Q is equal to N.

3. The method for channel information feedback according to claim 2, wherein all vectors in the first channel information are vectors of a same model.

4. The method for channel information feedback according to claim 3, wherein the vector of the model is $v_i$ or $f(v_i, v_j)$, wherein, $v_i = [1\ e^{j\phi_i}\ L\ e^{j(n-1)\phi_i}]^H$, $v_j = [e^{j\phi_j}\ L\ e^{j(n-1)\phi_j}]^H$, m and n are integers which are greater than 1, and $\phi_i, \phi_j$ is any phase value in 0-2 pi; or the vector of the model is $K^*v_i$, or $K^*f(v_i, v_j)$, wherein K is any complex number.

5. The method for channel information feedback according to claim 1, wherein the information matrix is $$\begin{bmatrix} F(u_1 \ldots u_N, e^{j\theta_1} \ldots e^{j\theta_N}) & F(u_1 \ldots u_N, e^{j\theta_1} \ldots e^{j\theta_N}) \\ aF(u_1 \ldots u_N, e^{j\theta_1} \ldots e^{j\theta_N}) & -aF(u_1 \ldots u_N, e^{j\theta_1} \ldots e^{j\theta_N}) \end{bmatrix},$$

wherein F is a preset function and the information matrix can also be expressed $$asK^* \begin{bmatrix} \sum_{i=1}^{N} e^{j\theta_i} u_i & \sum_{i=1}^{N} e^{j\theta_i} u_i \\ a\sum_{i=1}^{N} e^{j\theta_i} u_i & -a\sum_{i=1}^{N} e^{j\theta_i} u_i \end{bmatrix},$$

wherein K is a complex number; and a is a complex number and a value of a is 1, or −1, or j, or −j, or (1+j)/sqrt2, or (1−j)/sqrt2, or (−1+j)/sqrt2 or (−1−j)/sqrt2, wherein sqrt denotes a square root operator, or, wherein the information matrix is $$\begin{bmatrix} F(u_1 \ldots u_N, e^{j\theta_1} \ldots e^{j\theta_{N-1}}) & F(u_1 \ldots u_N, e^{j\theta_1} \ldots e^{j\theta_{N-1}}) \\ aF(u_1 \ldots u_N, e^{j\theta_1} \ldots e^{j\theta_{N-1}}) & -aF(u_1 \ldots u_N, e^{j\theta_1} \ldots e^{j\theta_{N-1}}) \end{bmatrix},$$

wherein F is a preset function and the information matrix can also be expressed $$asK^* \begin{bmatrix} u_1 + \sum_{i=2}^{N} e^{j\theta_{i-1}} u_i & u_1 + \sum_{i=2}^{N} e^{j\theta_{i-1}} u_i \\ au_1 + a\sum_{i=2}^{N} e^{j\theta_{i-1}} u_i & -au_1 - a\sum_{i=2}^{N} e^{j\theta_{i-1}} u_i \end{bmatrix},$$

or, wherein the information matrix is $$\begin{bmatrix} F(u_1 \ldots u_N, e^{j\theta_1} \ldots e^{j\theta_N}) & F(u_1 \ldots u_N, e^{j\varphi_1} \ldots e^{j\varphi_N}) \\ aF(u_1 \ldots u_N, e^{j\theta_1} \ldots e^{j\theta_N}) & -aF(u_1 \ldots u_N, e^{j\varphi_1} \ldots e^{j\varphi_N}) \end{bmatrix},$$

wherein F is a preset function and the information matrix can also be expressed $$asK^* \begin{bmatrix} \sum_{i=1}^{N} e^{j\theta_i} u_i & \sum_{i=1}^{N} e^{j\varphi_i} u_i \\ a\sum_{i=1}^{N} e^{j\theta_i} u_i & -a\sum_{i=1}^{N} e^{j\varphi_i} u_i \end{bmatrix},$$

or, wherein the information matrix is $$\begin{bmatrix} F(u_1 \ldots u_N, e^{j\theta_1} \ldots e^{j\theta_{N-1}}) & F(u_1 \ldots u_N, e^{j\varphi_1} \ldots e^{j\varphi_{N-1}}) \\ aF(u_1 \ldots u_N, e^{j\theta_1} \ldots e^{j\theta_{N-1}}) & -aF(u_1 \ldots u_N, e^{j\varphi_1} \ldots e^{j\varphi_{N-1}}) \end{bmatrix},$$

wherein F is a preset function and the information matrix can also be expressed $$asK^* \begin{bmatrix} u_1 + \sum_{i=2}^{N} e^{j\theta_{i-1}} u_i & u_1 + \sum_{i=2}^{N} e^{j\varphi_{i-1}} u_i \\ au_1 + a\sum_{i=2}^{N} e^{j\theta_{i-1}} u_i & -au_1 - a\sum_{i=2}^{N} e^{j\varphi_{i-1}} u_i \end{bmatrix}.$$

6. The method for channel information feedback according to claim 5, wherein the second channel information further comprises amplitude information $A_1, A_2, \ldots A_P$, or $B_1, B_2, \ldots B_{P-1}$, wherein A and B represent amplitude information.

7. The method for channel information feedback according to claim 6, wherein the information matrix is $$\begin{bmatrix} F\begin{pmatrix} u_1 \ldots u_N, e^{j\theta_1} \ldots e^{j\theta_N}, \\ A_1 \ldots A_N \end{pmatrix} & F\begin{pmatrix} u_1 \ldots u_N, e^{j\theta_1} \ldots e^{j\theta_N}, \\ A_1 \ldots A_N \end{pmatrix} \\ aF\begin{pmatrix} u_1 \ldots u_N, e^{j\theta_1} \ldots e^{j\theta_N}, \\ A_1 \ldots A_N \end{pmatrix} & -aF\begin{pmatrix} u_1 \ldots u_N, e^{j\theta_1} \ldots e^{j\theta_N}, \\ A_1 \ldots A_N \end{pmatrix} \end{bmatrix},$$

wherein F is a preset function and the information matrix can also be expressed $$asK^* \begin{bmatrix} \sum_{i=1}^{N} A_i e^{j\theta_i} u_i & \sum_{i=1}^{N} A_i e^{j\theta_i} u_i \\ a\sum_{i=1}^{N} A_i e^{j\theta_i} u_i & -a\sum_{i=1}^{N} A_i e^{j\theta_i} u_i \end{bmatrix},$$

or,
wherein the information matrix is $$\begin{bmatrix} F\begin{pmatrix} u_1 \ldots u_N, e^{j\theta_1} \ldots e^{j\theta_{N-1}}, \\ B_1 \ldots B_{N-1} \end{pmatrix} & F\begin{pmatrix} u_1 \ldots u_N, e^{j\theta_1} \ldots e^{j\theta_N}, \\ B_1 \ldots B_{N-1} \end{pmatrix} \\ aF\begin{pmatrix} u_1 \ldots u_N, e^{j\theta_1} \ldots e^{j\theta_{N-1}}, \\ B_1 \ldots B_{N-1} \end{pmatrix} & -aF\begin{pmatrix} u_1 \ldots u_N, e^{j\theta_1} \ldots e^{j\theta_N}, \\ B_1 \ldots B_{N-1} \end{pmatrix} \end{bmatrix},$$

wherein F is a preset function and the information matrix can also be expressed $$asK^* \begin{bmatrix} u_1 + \sum_{i=2}^{N} B_{i-1} e^{j\theta_{i-1}} u_i & u_1 + \sum_{i=2}^{N} B_{i-1} e^{j\theta_{i-1}} u_i \\ au_1 + a\sum_{i=2}^{N} B_{i-1} e^{j\theta_{i-1}} u_i & -au_1 - a\sum_{i=2}^{N} B_{i-1} e^{j\theta_{i-1}} u_i \end{bmatrix},$$

or,
wherein the information matrix is $$\begin{bmatrix} F\begin{pmatrix} u_1 \ldots u_N, e^{j\theta_1} \ldots e^{j\theta_N}, \\ A_1 \ldots A_N \end{pmatrix} & F\begin{pmatrix} u_1 \ldots u_N, e^{j\varphi_1} \ldots e^{j\varphi_N}, \\ A_1 \ldots A_N \end{pmatrix} \\ aF\begin{pmatrix} u_1 \ldots u_N, e^{j\theta_1} \ldots e^{j\theta_N}, \\ A_1 \ldots A_N \end{pmatrix} & -aF\begin{pmatrix} u_1 \ldots u_N, e^{j\varphi_1} \ldots e^{j\varphi_N}, \\ A_1 \ldots A_N \end{pmatrix} \end{bmatrix},$$

wherein F is a preset function the information matrix can also be expressed as $$\begin{bmatrix} \sum_{i=1}^{N} e^{j\theta_i} A_i u_i & \sum_{i=1}^{N} e^{j\varphi_i} A_i u_i \\ a\sum_{i=1}^{N} e^{j\theta_i} A_i u_i & -a\sum_{i=1}^{N} e^{j\varphi_i} A_i u_i \end{bmatrix},$$

or,
wherein the information matrix is $$\begin{bmatrix} F\begin{pmatrix} u_1 \ldots u_N, e^{j\theta_1} \ldots e^{j\theta_{N-1}}, \\ B_1 \ldots B_{N-1} \end{pmatrix} & F\begin{pmatrix} u_1 \ldots u_N, e^{j\varphi_1} \ldots e^{j\varphi_{N-1}}, \\ B_1 \ldots B_{N-1} \end{pmatrix} \\ aF\begin{pmatrix} u_1 \ldots u_N, e^{j\theta_1} \ldots e^{j\theta_{N-1}}, \\ B_1 \ldots B_{N-1} \end{pmatrix} & -aF\begin{pmatrix} u_1 \ldots u_N, e^{j\varphi_1} \ldots e^{j\varphi_{N-1}}, \\ B_1 \ldots B_{N-1} \end{pmatrix} \end{bmatrix},$$

wherein F is a preset function and the information matrix can also be expressed as $$K^* \begin{bmatrix} u_1 + \sum_{i=2}^{N} e^{j\theta_{i-1}} B_{i-1} u_i & u_1 + \sum_{i=2}^{N} e^{j\varphi_{i-1}} B_{i-1} u_i \\ au_1 + a\sum_{i=2}^{N} e^{j\theta_{i-1}} B_{i-1} u_i & -au_1 - a\sum_{i=2}^{N} e^{j\varphi_{i-1}} B_{i-1} u_i \end{bmatrix}.$$

8. The method for channel information feedback according to claim 1, wherein the function is set according to a pre-appointment between the base station and the terminal; or the function is set and determined by the terminal and the terminal feeds back the determined function to the base station.

9. The method for channel information feedback according to claim 2, wherein including phase value information $\varphi_1, \varphi_2, \ldots \varphi_P$ is different from including phase value information $\varphi_1, \varphi_2, \ldots \varphi_P$ and phase value information $\theta_1, \theta_2, \ldots \theta_Q$.

10. The method for channel information feedback according to claim 2, wherein the value of the N or the second channel information is notified to the terminal by the base station through UE specific signaling; or the N or the second channel information is judged and fed back by the terminal to the base station.

11. The method for channel information feedback according to claim 10, wherein the signaling is high layer signaling and is applied to periodic feedback;
the signaling is physical layer control signaling, is transmitted together with aperiodic feedback trigger signaling and is applied to aperiodic feedback.

12. A base station, configured to derive precoding weights to be used for transmitting to a terminal based on quantified channel information; wherein the quantified channel information is derived based on quantified channel parameters and information matrix used by the terminal;
the base station transmitting to the terminal using the derived weights;
wherein the information matrix consists of a plurality of block matrixes, and each block matrix is obtained by a linear combination of vectors in N vectors $u_1, u_2 \ldots u_N$, wherein u is a vector.

13. The base station according to claim 12, wherein the base station is further configured to transmit a channel measurement pilot to a terminal.

14. A terminal, configured to perform channel measurement, construct an information matrix according to a preset function, determine quantified channel parameters and feed back the channel parameters to a base station, the information matrix used for representing channel information;
wherein the information matrix consists of a plurality of block matrixes, and each block matrix is obtained by a linear combination of vectors in N vectors $u_1, u_2 \ldots u_N$, wherein u is a vector.

15. The terminal according to claim 14, wherein the channel information obtained through the channel measurement comprises first channel information and second channel information,
wherein the first channel information at least comprises information indicating the N vectors $u_1, u_2 \ldots u_N$; and the second channel information comprises phase value information $\varphi_1, \varphi_2, \ldots \varphi_P$; or
comprises phase value information $\varphi_1, \varphi_2, \ldots \varphi_P$ and phase value information $\theta_1, \theta_2, \ldots \theta_Q$, wherein N>=2, P is equal to N and Q is equal to N.

16. The terminal according to claim 15, wherein the second channel information further comprises amplitude information $A_1, A_2, \ldots A_P$, or $B_1, B_2, \ldots B_{P-1}$, wherein A and B represent amplitude information.

* * * * *